UNITED STATES PATENT OFFICE 2,396,163

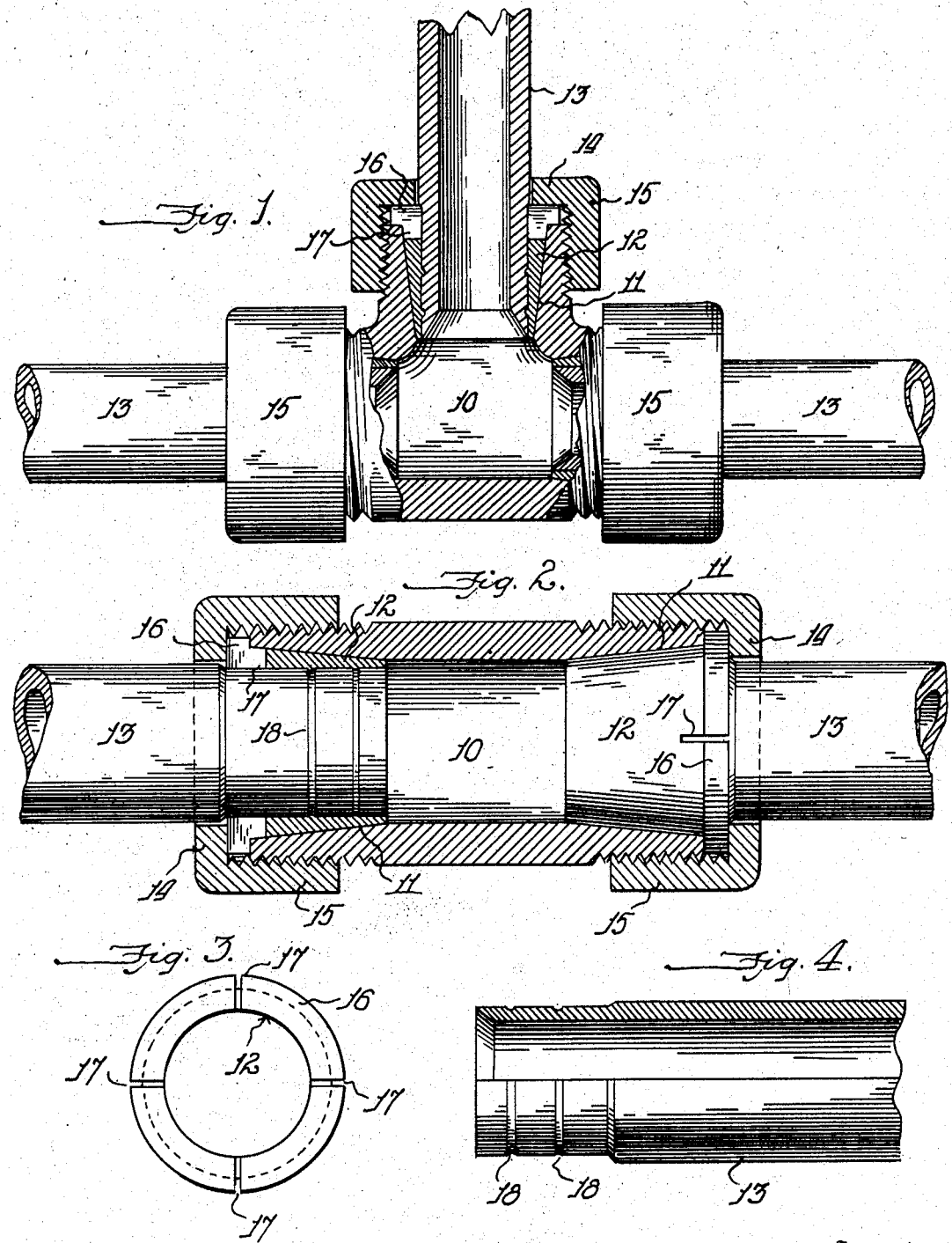

PIPE COUPLING

Charles A. Dies, Chicago, Ill.

Application July 15, 1943, Serial No. 494,865

1 Claim. (Cl. 285—196)

My invention is an improvement in pipe couplings, and relates more especially to that type in which the threadless pipe is secured in the coupling through the medium of a tapered sleeve or bushing surrounding the end of the pipe and engaging an opening in the coupling which is similarly tapered and into which it is forced by means of a flanged nut.

Some difficulty has been experienced in couplings of this kind to provide a tight joint that will withstand high pressure and jars or vibrations; that is to say, couplings of this general character when used in high pressure lines, as well as those subjected to vibrations, are likely to loosen to such extent as to develop leaks or disconnect one or more of the parts of the coupling, and it is the purpose of my invention to overcome these defects by a rigid connection between the pipe and coupling.

It is the principal object of my invention, therefore, to so construct the engaging parts of the coupling that they will cooperate to insure a rigid joint between the pipe and coupling, effected in this instance by a particular construction of the bushing associated with a particular formation of the end of the pipe with which it engages, whereby the meeting faces of the bushing and pipe will be more intimately engaged than heretofore and in such manner as to resist high pressure fluid conducted by the pipe line as well as resist vibrations and other conditions to which the pipe line may be subjected; all as hereinafter described and more specifically set forth in the appended claim.

In the accompanying drawing:

Fig. 1 is an elevation showing the application of my invention to a T-coupling, part of which is broken away to disclose the manner of connecting the pipe thereto.

Fig. 2 is an enlarged view of a coupling in which some of the parts thereof are in section to better illustrate the bushing and pipe and their intimate engagement with each other and with the coupling.

Fig. 3 is a detail view of the tapered sleeve or bushing, and

Fig. 4 is a detail side elevation of the end portion of the pipe which is confined within the coupling, one-half of the pipe being shown in section.

The improvements I have made may be employed in connection with any of various types of pipe couplings—examples being shown in the drawing—in each instance the body portion or coupling 10 being provided with the usual tapered opening 11 to receive the correspondingly tapered bushing 12 surrounding the end portion of the pipe, 13, and engaged by the flange 14 of nut 15, the latter being threaded on the outer end of the pipe-receiving projection of the body portion or coupling to force the bushing into the space between the pipe and contiguous wall of the tapered opening in said projection in clamping the parts of the pipe coupling together.

For the purpose of carrying out my invention the tapered sleeve, or bushing, is provided at its outer end with an outwardly projecting reinforcing flange 16—forming also a packing ring—and with radial slots 17 extending inwardly from the outer end of the sleeve a slight distance beyond the inner side of the flange so that this portion of the sleeve and its flange will have a certain amount of resiliency permitting it to be contracted when said sleeve is forced into the space between the pipe and coupling, and to cooperate with this sleeve, in effecting a rigid joint, the end portion of the pipe is slightly reduced in diameter and provided with circumferential indentations or grooves 18 into which the metal of the sleeve or bushing is compressed by the turning of the flanged nut on the coupling. As will be noted a shoulder is formed at the inner end of the reduced portion of the pipe, and this, shoulder serves to limit the extent to which the pipe projects into the coupling by engagement of the end of the sleeve against the same, as shown in Fig. 2.

The tapered sleeve or bushing, 12, is made of malleable metal, preferably copper or brass, so that when it is forced into the space between the pipe and wall of the tapered opening part of the metal will be crowded into the indentations or grooves to form engaging ribs integral with the sleeve—to overcome end pressure—and in this operation it is essential that the flanged end of the sleeve be permitted to slightly contract, provided for by the aforementioned slots. Though I have shown four slots in the outer end portion of the sleeve the number may be increased or diminished according to the resiliency desired, and it will be understood that the flange not only reinforces the outer end of the sleeve—where it is engaged by the flange on the nut—but it also forms a packing ring between the outer end of the coupling and flange on the nut when the nut is tightened to crowd the metal of the sleeve into the indentations or grooves in the pipe. It will be understood, also, that the circumferential grooves are shallow or of sufficient depth to not only cooperate with the engagement of the inner surface of the sleeve with the tooled end of the pipe, for sealing the pipe within the coupling, but also serves to overcome loosening of the parts of the coupling under the stress of vibrations or end pressure when the pipe line is used for conducting fluid under high pressure.

In addition to shaping that portion of the pipe which is confined within the coupling in the manner described the inner end of the bore of the pipe is beveled, as shown in the drawing, to offer less resistance to the flow of liquid through the same, as well as provide a thin inner edge that may expand within the sleeve or bushing and act to further seal the joint. Consequently this formation of the inner end of the pipe is effective in combination with the other novel features of construction in providing a very desirable coupling for use in high pressure pipe lines.

From the foregoing description it will be obvious that when the parts of the coupling are assembled the initial tightening of the flanged nut will exert pressure on the tapered sleeve to bind it between the pipe and coupling member, and that further tightening of the nut will draw the pipe into the coupling member to an extent limited by the shoulder at the inner end of the reduced portion of the pipe and coincidentally cause the malleable metal of the sleeve to expand or crowd into the indentations or grooves in the pipe, while the flange at the outer end of the sleeve—slightly contracted during this operation—will be clamped between the end of the coupling and flange within the outer end of the nut. By reason of my improvements, therefore, a rigid connection of the parts is effected, and the use of copper—or other malleable metal of this general character—in making the sleeve will establish an unyielding engagement between the sleeve and pipe to effectually resist end pressure as well as provide a strong joint, whereby the coupling is well adapted to meet various conditions that may be anticipated in the installation of pipe lines requiring a firm and secure joint.

I have already mentioned some obvious modifications or changes which may be made in the practice of my invention without materially affecting the rigidity of the connection between the pipe and coupling, and in tests I have made it has been found that a single indentation or groove, 18, in the pipe will answer the purpose as well as two. When a single groove is used it should be approximately one-eighth of an inch wide and five thousandths of an inch deep; in other words, the groove or grooves must be of a depth and width to insure the crowding of a part of the malleable metal of the sleeve into the groove or grooves—to provide an integral rib or ribs that will aid the contiguous engaging surfaces of sleeve and pipe in resisting end pressure. Other such modifications or changes may be made within the spirit and scope of the claim.

I claim:

A coupling for pipe lines adapted to conduct high pressure fluid comprising a coupling member having tapered openings therein to receive pipes to be connected thereto, malleable metal sleeves interposed between the ends of the pipes and body of the coupling member, the sleeve in each instance being provided with an external flange at its outer end to form a packing ring in connection with the coupling member and having a plurality of slits extending longitudinally through the flange and for a short distance into the body of the sleeve to permit of slight contraction of the outer end of the latter in coupling the pipe thereto; the pipe having its outer end portion reduced in diameter corresponding with the internal diameter of the sleeve and length of the same to provide a smooth circumference with a shoulder at the inner end thereof, and said pipe having circumferential grooves in the reduced portion into which metal of the malleable metal sleeve is crowded to form integral ribs on the sleeve engaging the grooves in the pipe to resist end pressure; together with flanged nuts connecting the pipes to the coupling member and engaging the outer ends of the sleeves for compressing the sleeves by engagement with the flange at the outer end of each sleeve.

CHARLES A. DIES.